TAPE DRIVE IN MAGNETIC TAPE RECORDER

Filed April 9, 1963 2 Sheets-Sheet 1

INVENTOR.
TADAO SHIRAI
BY Eyre, Mann & Lucas

Feb. 8, 1966 TADAO SHIRAI 3,233,806

TAPE DRIVE IN MAGNETIC TAPE RECORDER

Filed April 9, 1963 2 Sheets-Sheet 2

INVENTOR.

TADAO SHIRAI

BY Eyre, Mann & Lucas

United States Patent Office 3,233,806
Patented Feb. 8, 1966

3,233,806

TAPE DRIVE IN MAGNETIC TAPE RECORDER

Tadao Shirai, Kawasaki-shi, Japan, assignor to Akai Electric Company Limited, Tokyo, Japan, a corporation of Japan Filed Apr. 9, 1963, Ser. No. 271,794
2 Claims. (Cl. 226—178)

The present invention relates broadly to a magnetic tape recording machine, and more particularly to a tape speed control mechanism of the machine for two speeds.

As commonly known to those skilled in the art, the magnetic tape is fed forward generally by being pinched between a constantly rotating capstan shaft and a pinch roll adapted to cooperate therewith, when the machine operates for recording or playback service as the case may be. For quick winding service, or when the machine is off-service, the pinch roll is kept in disengagement from the capstan shaft.

For obtaining an improved tone quality, there has been employed two-speed control for the tape running in the case of recording or playback service of the machine. For this purpose according to the conventional technique, a detachable capstan is fitted on the top of the capstan shaft. When a slower tape speed is required, the capstan is manually removed from the shaft to expose a reduced shaft end for the cooperation with both the tape and the pinch roll.

On the other hand, when a faster tape speed is required so as to obtain an improved tone quality, the capstan is refitted manually to the shaft end so as to provide an enlarged peripheral shaft surface for the cooperation with the tape and the pinch roll in the similar way.

Such manual fitting and removing procedures are naturally highly cumbersome and time consuming as met in the conventional technique. It is therefore an object of the present invention to overcome the above disadvantages.

It is another object of the present invention to provide a superior two-speed tape control mechanism for quick change of the tape speed when desired.

It is yet another object of the present invention to provide a tape speed change-off mechanism of the kind above referred to which is conveniently constructed of the push button type.

It is a still further object of the present invention to provide a tape speed change-off mechanism of the kind above referred to which is simple in its design, accurate in its operation and cheap in its manufacturing cost.

These and other objects of the invention will be more apparent to those skilled in the art from a consideration of the following detailed description when taken together with the accompanying drawings in which.

Figures 1, 2:
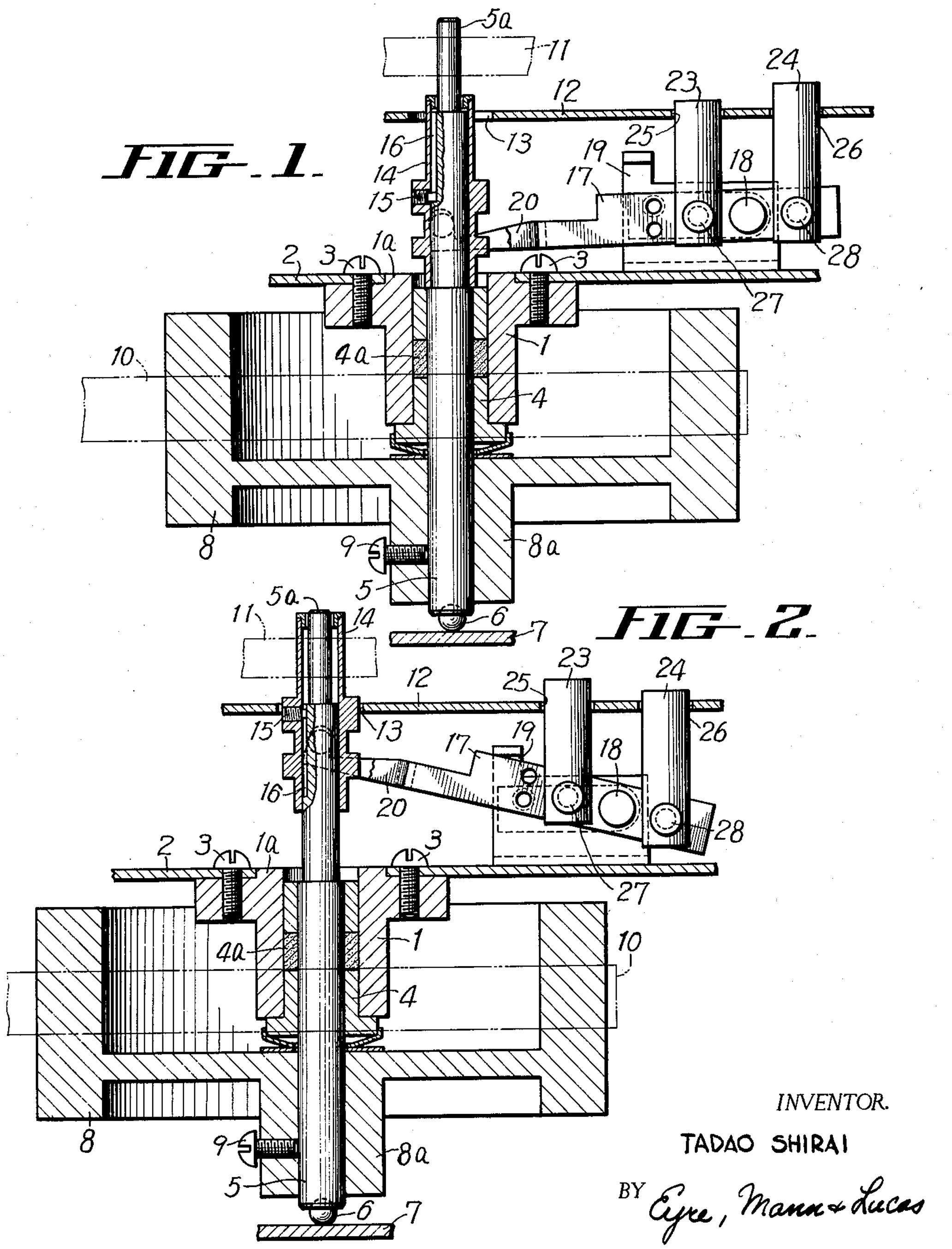
FIG. 1 represent essential parts of a first embodiment of the invention in its vertical section.
FIG. 2 is a similar sectional view to FIG. 1, yet showing a different operating mode of the mechanism.
Figure 3:
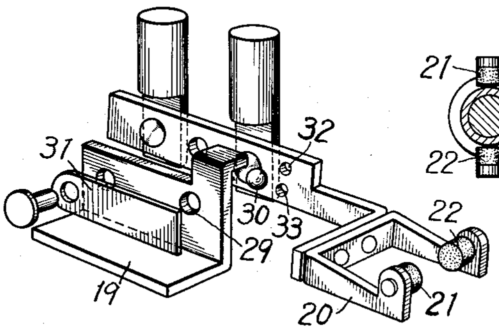
FIG. 3 is a perspective view of part of the mechanism shown in FIGS. 1 and 2.

Now referring to the accompanying drawings, especially FIGS. 1–4 thereof, a preferred embodiment of this invention will be described in detail.

In this embodiment, a flanged sleeve 1 is provided with a projecting upper end 1*a* which is snugly received by a corresponding circular opening formed in a conventional base panel 2 of the machine. This sleeve 1 is fixedly, yet detachably attached to the bottom surface of the panel 2 by means of a plurality of fixing screws 3, the panel being shown only partly in the drawings. A flanged bearing cylinder 4 is inserted from the bottom into the bore of sleeve 1 and kept in position in a press fit manner as conventionally employed. A part of the cylinder 4*a* is made of an oil-containing porous metal for improving the bearing and lubricating performance.

Through the thus formed bearing assembly 1 and 4, a capstan shaft 5 of conventional design passes rotatably and slidably, yet with a close clearance therebetween. The shaft is formed into a three stepped shape as shown and provided at its lowermost and largest end with a ball 6 received partially in a spherical recess formed in the shaft end. The ball is kept in engagement with a suitable stationary member 7 of the machine. For easy assembly of the capstan shaft and is bearing assembly so far described, the member 7 may preferably be so constructed that it is pivotable when desired. It will thus be obvious that the member 7 normally prevents the capstan shaft from slipping out of the radial bearing assembly 1 and 4 and provides in cooperation with the ball 6 an effective thrust bearing for the shaft. A flywheel 8 of a considerable inertia mass is formed with a boss 8*a* and detachably fixed to the lower part of capstan shaft 5 by means of a set screw 9. A belt, shown only diagrammatically by chain-dotted line 10 in the drawing, is placed around the rim of the flywheel so as to transmit rotation from a conventional capstan motor, not shown, to the capstan shaft. The uppermost end of the shaft is most reduced as at 5*a* and adapted to pinch a conventional magnetic tape in cooperation with a pinch roll, not shown, the tape being shown in the drawing only partly and diagrammatically by chain-dotted line 11 for simplicity of the drawing.

A conventional deck panel 12 of the machine is formed with an opening 13, through which the upper end of capstan shaft 5 passes with a considerably large play. A double-flanged capstan 14 is slidably mounted with a close play on the intermediate step of the shaft 5 which extends from the upper end of bearing cylinder 4 and a screw pin 15 passes through the upper flange of capstan 14 and projects into a longitudinal guide groove 16 formed in the upper portion of the aforementioned intermediate shaft step, whereby sliding movement of the capstan can be positively guided. The diameter of the upper end portion 5*a* of the capstan is so selected that the outside peripheral surface thereof may provide a larger contact surface to the magnetic tape 11, as will be more fully described hereinafter.

A yoke lever 17 is pivotably supported at an intermediate point between the both ends thereof by means of a horizontal pivot pin 18 which is in turn supported by a pedestal 19 fixed on the base 2. The tip end of the lever 17 is formed with a fork 20 which is provided with a pair of inwardly opposed pads 21–22 fixed to the both arms of the fork. These pads are made of a resilient, wear resisting material such as nylon and normally kept in engagement with the circular groove formed between the aforementioned flanges or collars of the slidable capstan. The yoke lever and fork are made from a suitable resilient material such as spring steel so that when necessary, the pads 21–22 may be easily disengaged from the cooperating groove by spreading manually the carrying arms of the fork apart. A couple of push buttons 23 and 24 slidably pass with play through respective openings 25 and 26 formed in the deck panel 12. The lower portions of these buttons are properly reduced and pivoted to the yoke lever at separated points as at 27 and 28, respectively, at opposite sides of pivot 18.

Figure 4:
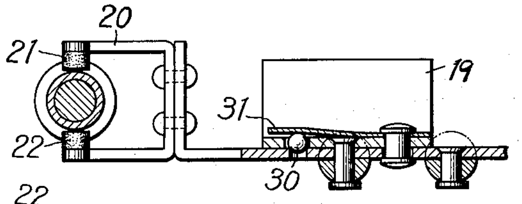
FIG. 4 is a top plan view of parts of the mechanism shown in FIG. 3, wherein however several parts are shown in section.

As most clearly seen from FIG. 4, pedestal 19 is formed in its vertical wall with a small opening 29 and a ball 30 is rotatably contained therein. A leaf spring 31 is held in position by pivot pin or rivet 18 and prevents the ball from dropping out of opening 29. In the assembled position shown in FIG. 4, the ball projects a small distance out of the reception opening 29 at the opposite side thereof to the pedestal 19 and engages in either of vertically separated stop openings 32 and 33 formed in the yoke lever in front of pivot 27, for the purpose of selectively positioning the lever.

The operation of the above mechanism is as follows:

When it is desired to operate the machine for recording or play-back service, the capstan motor, not shown, is energized and motion is thus transmitted therefrom through belt 10 and flywheel 8 so as to rotate the capstan shaft at a predetermined constant speed. If a slow tape speed is required, push button 23 is depressed as shown in FIG. 1 so as to expose the reduced uppermost end **5*a*** of the capstan shaft. Next, the pinch roll, not shown, is operated as conventionally so as to cooperate with the capstan shaft. Then, the tape will be delivered at a slow feed speed by being caught between the capstan shaft and the pinch roll as is conventional.

When it is desired to adopt a high speed tape drive, the pinch roll is first separated from the capstan shaft and then the other push button 24 is depressed.

By this manipulation, the yoke lever is turned clockwise in FIG. 1 and motion is thus transmitted therefrom through pads 21–22 to the slidable capstan so as to elevate the latter in its position to the position shown in FIG. 2 along the capstan shaft. In this case, a positive guiding effect is obtainable by the slidable engagement of screw pin 15 in the cooperating guide groove 16. It will thus be clear that the capstan is kept in rotation if the above change-off manipulation is carried into effect with the capstant shaft kept in rotation. On the contrary, when the manipulation is carried out with the capstan motor kept stopped, the capstan will only slide along the capstan shaft without rotation. Anyhow, the capstan will provide a larger operating peripheral surface than that of the reduced shaft end **5*a*** so that the tape may be driven at a faster speed than before when the pinch roll is manipulated to cooperate with the rotating capstan shaft.

With the capstan elevated or lowered in the aforementioned manner, the yoke lever is kept in its operative position by the positive engagement of ball 30 with opening 33 or 32, as the case may be.

Figure 5:
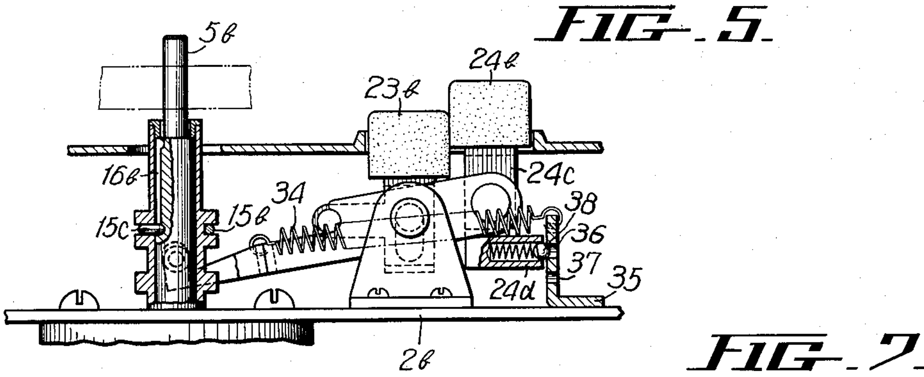
FIGS. 5, 6 and 7 are similar views to FIGS. 1, 2 and 3, respectively, yet showing a somewhat modified mechanism from that shown in FIGS. 1–4.
Figure 7:
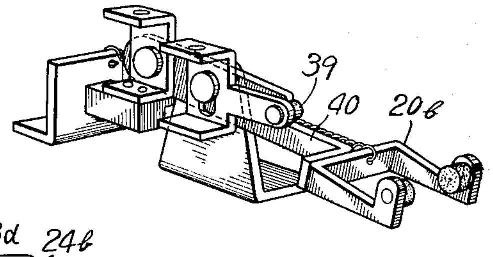
Figure 6:
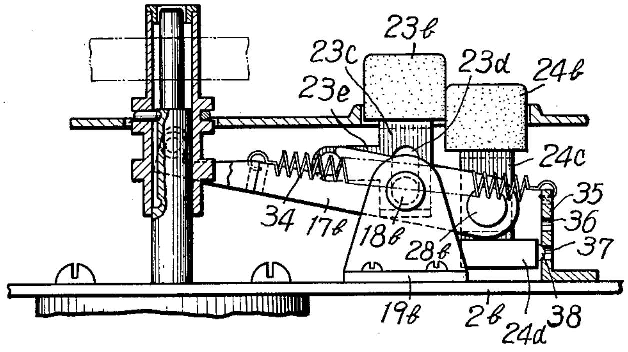

In a modified embodiment shown in FIGS. 5–7, similar parts to those employed in the preceding embodiment are denoted by same reference numerals, yet affixed each with a character "*b*." In the present modification, there is employed a snap spring mechanism for the manipulation of the slidable capstan **14*b*. More specifically, a snap spring 34 is tensioned between the fork end 20*b* of lever 17*b*, on the one hand, and a stationary angle piece 35 fixedly mounted on the base 2*b*, on the other hand. Further, guide pin 15 is transformed into a clip spring 15*b* which encircles a circular groove formed around the periphery of the upper flange of capstan 14*b* and is provided with an inwardly bent tip end 15*c*. The thus formed pin end 15*c* is kept in engagement with longitudinal groove 16*b* which is provided in turn with two recesses at its both ends so that the capstan may be positioned positively in either selected upper or lower position upon the manipulation of either push button 23*b* or 24*b*. For further accurate positioning, angle piece 35 is formed with a pair of separated openings 36–37 which are adapted to engage with a spring-urged ball 38 placed at the inlet of a blind bore in the lateral extension 24*d* of stem of push button 24*b*. The stem 24*c* of the button is pivoted to the right-hand end of yoke lever 17*b* by means of a pivot 28*b* substantially in the same manner as before. Instead of being separately pivoted, one of the push buttons, for instance that denoted by 23*b*, is pivoted by the pivot 18*b* for the yoke lever, and for this purpose the stem 23*c* is provided with a vertically elongated guide slot 23*d* which receives slidably the common pivot 18*b*, thus, in this case, the pivot connection between the button 23*b* and the yoke lever as was employed in the aforementioned embodiment as at 27 has been dispensed with. The stem of button 23 has a horizontal extension 23*e* which carries fixedly a pressure pin 39 for the cooperation with a shoulder 40** formed on the yoke lever.

In the present modified embodiment, a finger pressure exerted upon the push button **23*b* will depress the latter to its lowermost position shown in FIG. 5 by a positive engagement of the upper end wall of its slot 23*d* with the common pivot 18*b* fixedly mounted in pedestal 19*b*, whereby pressure pin 39 acts upon the shoulder 40 of yoke lever 17*b* so as to turn the latter counterclockwise in FIGS. 5–6. By this manipulation, the capstan is brought into its lower position shown in FIG. 5 and this position is positively held by the engagement of the pin end 15*c* with the lowermost enlarged end or recess of longitudinal guide groove 15*b*, on the one hand, and by the similar engagement of ball 38 with the upper opening 36, on the other hand. It will be clear from the foregoing that, in this case, the low speed tape drive is provided under the utilization of the reduced shaft end 5*b*. This position is positively maintained under the action of snap spring 34**.

When the right-hand push button **24*b* is depressed, the yoke lever 17*b* is turned clockwise in FIGS. 5–6 about pivot pin 18*b* and thus the capstan is finally brought into its uppermost position as shown in FIG. 6. It will be clear that a high speed drive is thus obtained under the utilization of larger peripheral surface of the capstan. The other button 23*b* is pushed upwards to its normal position by the upward pressure exerted by lever shoulder 40 through pin 39, projection 23*e* and stem 23*c* to the button. The related members are held positively in position as before by the pin-and-recess and ball-and-recess engagements under the influence of snap spring 34**.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a two speed tape drive of a magnetic tape recording and play-back machine, in combination, a capstan shaft adapted to rotate at a constant speed and to engage and drive the tape at a predetermined speed at a location adjacent the end of the shaft, a sleeve mounted on said capstan shaft for rotation therewith and slidable axially therealong from a first position where it is interposed between the tape and the shaft to engage and drive the tape at a higher speed to a second position where it is out of engagement with the tape, said sleeve having a pair of separated collars forming a peripheral groove therebetween, an operating lever mounted pivotally on said machine having a forked end engaging said groove, two push buttons pivotally connected with said lever for rocking the same, whereby upon depressing one of said push buttons said sleeve may be brought to said first position to provide a fast tape running speed or to its second position upon depressing the other push button to cause slow tape running speed by engagement of the capstan shaft with the tape, said sleeve being arranged to engage with and disengage from the tape without change in the level of the path of travel of the tape, and ball and recess means for yieldably locking said sleeve on said shaft at each of said two positions.

2. The tape speed change off mechanism as set forth in claim 1 including a key and groove arrangement between said sleeve capstan and said capstan shaft which comprises a key which is slidable in a groove which is arranged along the axis of the shaft.

References Cited by the Examiner

UNITED STATES PATENTS

| | | | |
|---|---|---|---|
| 2,644,660 | 7/1953 | Dudley | 5—332 X |
| 2,680,613 | 6/1954 | Williams | 226—102 |
| 2,681,224 | 6/1954 | Bessire | 226—110 |
| 2,996,229 | 8/1961 | Loewe | 226—50 |
| 3,050,225 | 8/1962 | Ulman | 226—178 X |

ROBERT B. REEVES, *Primary Examiner.*

RAPHAEL M. LUPO, *Examiner.*